March 15, 1949.  A. H. DICKINSON  2,464,561
RECORD FEEDING MACHINE
Original Filed Jan. 20, 1940  4 Sheets—Sheet 1

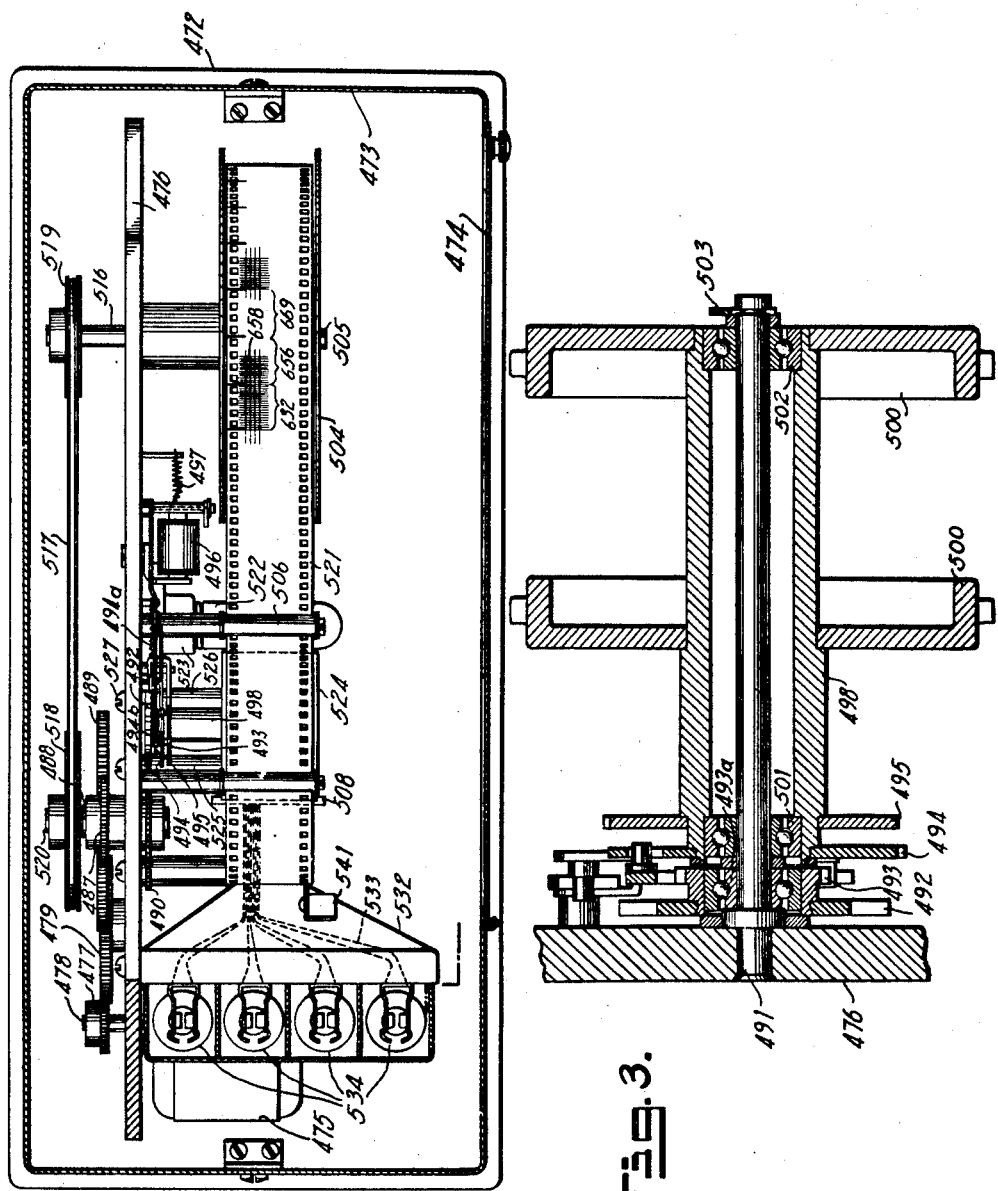

March 15, 1949. A. H. DICKINSON 2,464,561
RECORD FEEDING MACHINE
Original Filed Jan. 20, 1940 4 Sheets-Sheet 3
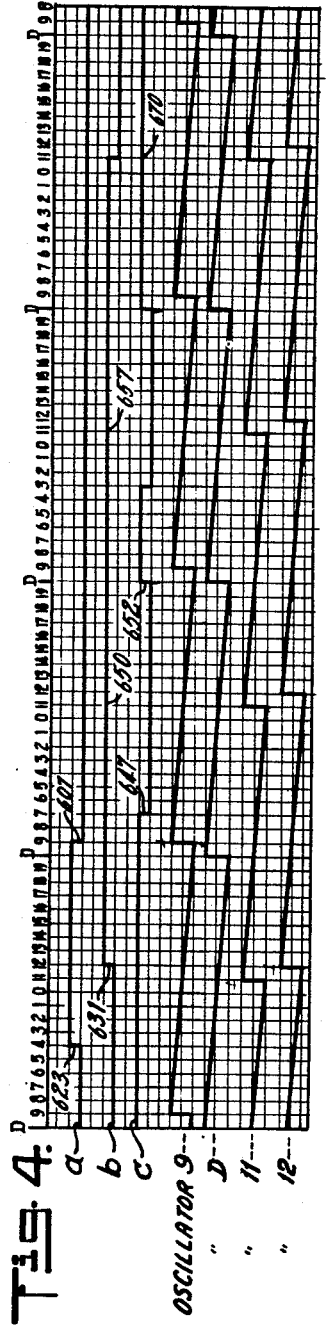
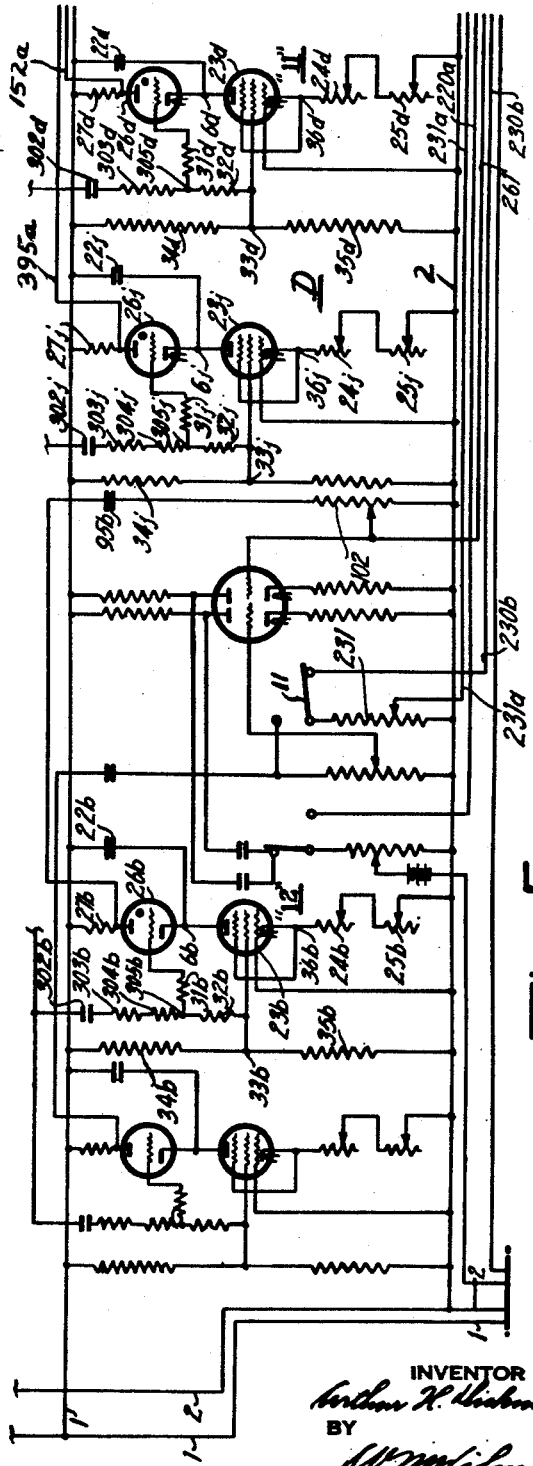
INVENTOR
Arthur H. Dickinson
BY
ATTORNEY March 15, 1949. A. H. DICKINSON 2,464,561
RECORD FEEDING MACHINE
Original Filed Jan. 20, 1940 4 Sheets-Sheet 4
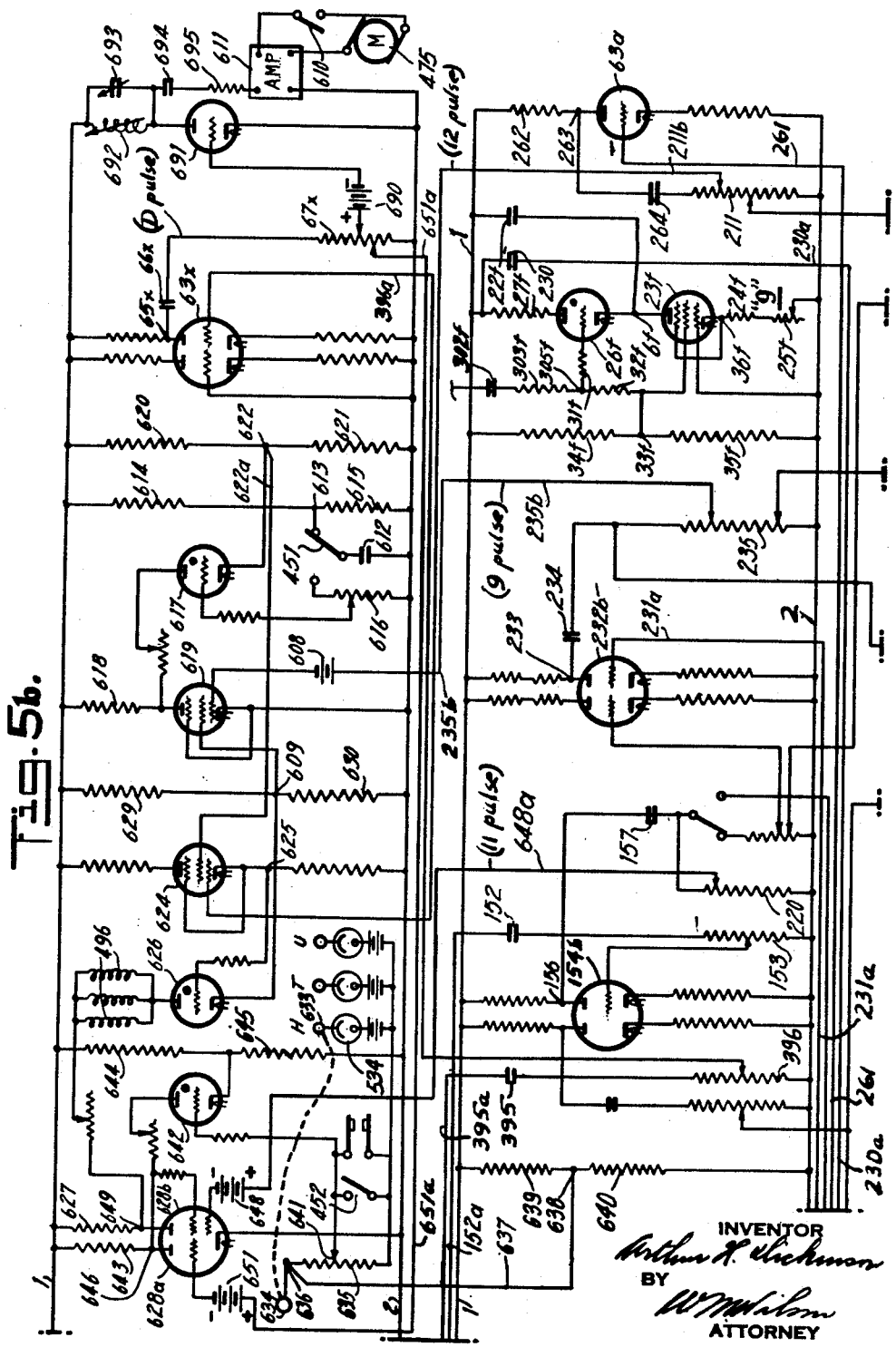

Patented Mar. 15, 1949

2,464,561

UNITED STATES PATENT OFFICE 2,464,561

RECORD FEEDING MACHINE

Arthur H. Dickinson, Scarsdale, N. Y., assignor to International Business Machines Corporation, New York, N. Y., a corporation of New York Original application January 20, 1940, Serial No. 314,767. Divided and this application June 24, 1943, Serial No. 492,085

8 Claims. (Cl. 192—127)

This application is a division of my copending application Serial No. 314,767, filed January 20, 1940, and relates to record feeding means and controls therefor.

In my copending application, a machine is disclosed for feeding records, comprised of frames of a film, past scanning means. The scanning means controls the operation of accounting mechanism in accordance with data designated in code on the records. Groups of such record frames are separated by blank frames. Each group usually has a common group factor, and it is desired to suspend film feed in order to perform certain operations respecting data derived from a group before the next group is operated upon. Further, when the last record is operated on, actuation of the feeding means should be suspended, and desired accounting operations performed. Data is designated on a record preferably in accordance with the known Hollerith code. According to this code, value 0, 1, 2 ... 8 or 9 is designated by marking a correspondingly denoted differential designation position of a column of the record; e. g., a mark in position 5 designates value 5.

The general object of the present invention is to provide novel means for controlling the feeding of records.

More specifically, an object of the invention is to provide photocell means for scanning a run of records to detect the presence or absence of data on such records and to suspend record feed when a date-less record is detected.

Another object of the invention is to provide electronic means for synchronizing the feed of records with the production of control pulses.

Another object of the invention is to provide electronic means for controlling the feeding of records in such manner as to suspend feed when a blank record is detected.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a section along lines 2—2 of Fig. 1.

Fig. 3 is an enlarged section along lines 3—3 of Fig. 1.

Fig. 4 is a timing diagram relating to operations with which this invention is concerned.

Figure 1:
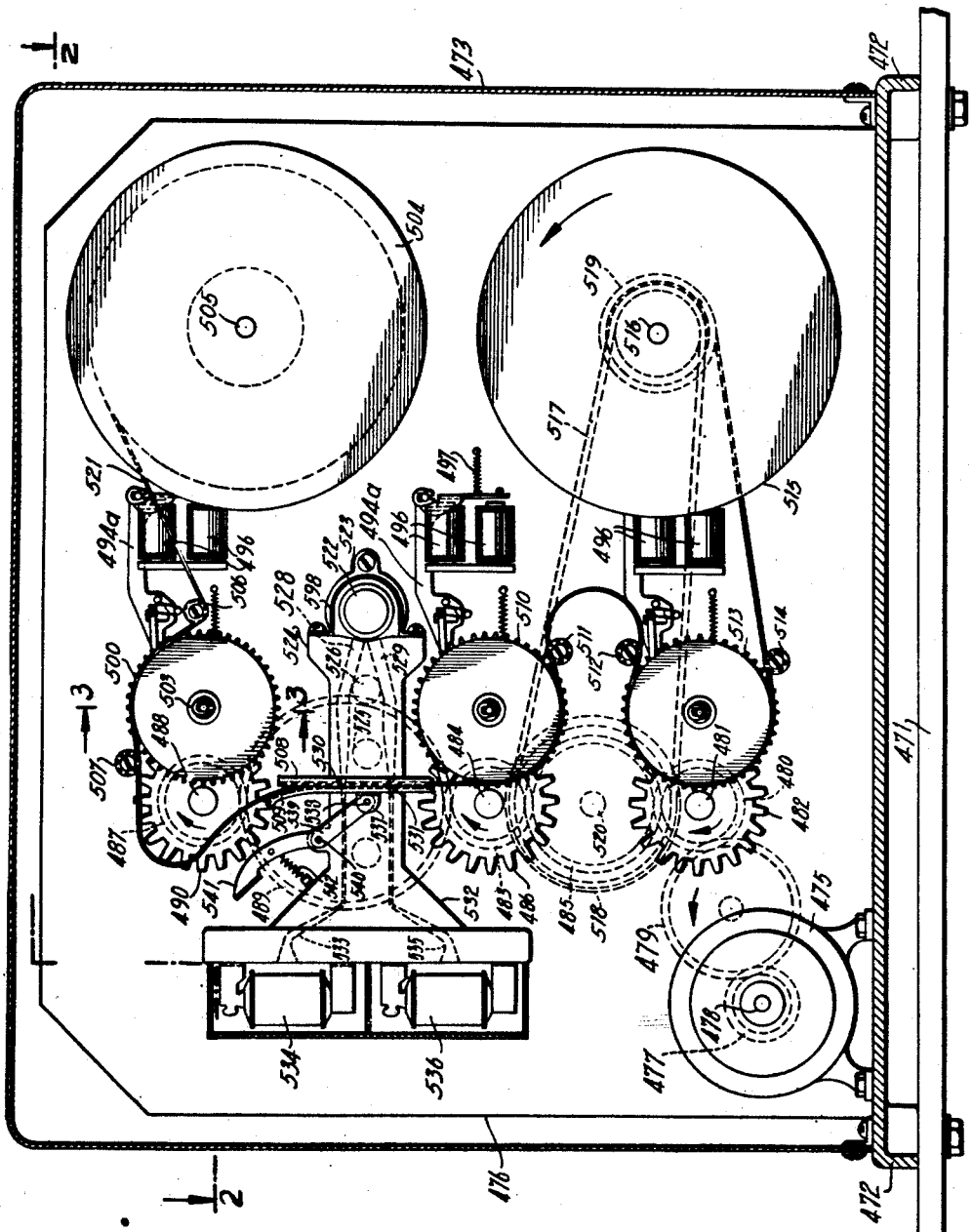
Fig. 1 is an elevation of the record feeding and scanning means, with the casing shown in section.

Figs. 5a and 5b constitute the circuit diagram, with figure 5b to be viewed as at the right of Fig. 5a.

MECHANICAL STRUCTURE (Figs. 1 to 3)

The record material is a film which is light-pervious except where marked by opaque spots. Successive frames of the film are utilized as records. Groups of records, each group having some common factor, are separated by blank frames. Each record bearing data may be considered as including parallel columns, each having value designation positions 9, 8 ... 0, and special positions 11 and 12. A value is designated in any column, according to the Hollerith code, by forming an opaque spot in the designation position corresponding to the desired value; e. g., value 5 is denoted by marking the 5 designation position of a column.

The film is controlled by a feeding mechanism whose operation is manually initiated, but automatically interrupted under certain conditions. The machine includes two scanning stations spaced apart a distance equal to the length of a single film frame. As each record passes the first or upper analyzing or scanning station, the presence or absence of data thereon is detected. If the record lacks such data, means comes into operation for suspending the feeding operation automatically at a predetermined point of the cycle.

The record feeding and analyzing unit is mounted on a base 472. A casing 473, having a hinged door 474 mounted therein, encloses the record feeding unit. As shown, the entire mechanism, with the exception of motor 475 is mounted on a plate 476.

Gear 477, on the drive shaft 478 of motor 475, engages idler gear 479 meshing with gear 480 fastened to shaft 481, journaled in plate 476. A portion of shaft 481, carrying gear 482, extends through plate 476.

Gear 480, meshing with idler gear 485 drives, at a 1 to 1 ratio, a gear 483 fastened to shaft 484, journaled in plate 476 and rigidly mounting a gear 486.

Gear 483 meshing with idler gear 489 drives at a 1 to 1 ratio a gear 487 mounted on shaft 488 journaled in plate 476 and rigidly carrying gear 490. Gears 482, 486 and 490 correspond to gears 24 of the U. S. Patent No. 2,150,227 to Lake and Pfaff and are provided with an equal number of teeth and are driven clockwise, at the same speed, by means of motor 475. In contrast to the rotation of gear 24 of said patent through one revolution per machine cycle, gears 482, 486 and 490 of the instant structure rotate at such a rate as to drive associated clutch mechanisms one-tenth of a revolution per machine cycle, for a purpose which will be clear later. Associated with each of these gears is a clutch mechanism substantially similar to the clutch described in said patent.

The elements of the uppermost clutch are shown as mounted on a stud 491 (Fig. 3) fastened to plate 476. The continually rotating parts of the clutch comprise a gear 492 and a ten-tooth ratchet 493, gear 492 being driven by meshing gear 490 (Fig. 1).

Gear 492 and ratchet 493 together comprise an assembly unit supported by ball bearing 493a carried by stud 491. A ratchet 494, a lever 494a, a lever extension 494b and a detent disk 495 are constructed as disclosed in said patent. Since the operation of the clutch is described in detail in the patent, it is sufficient to state here that when magnets 496 are energized, lever 494a disengages 494b from ratchet 494 which is released so that detent disk 495 is clutched in and rotates in unison with ratchet 493. Ratchet 494 is engaged by extension 494a to declutch 495 upon deenergization of magnets 496, a spring 497 being provided in the instant device of return the armature of the magnet to its non-attracted position.

A sleeve 498 is fastened to detent disk 495, ratchet 494 being loosely mounted on said sleeve. Film sprockets 500 are also fastened to the sleeve 498, and this sleeve is supported on ball bearings 501 and 502 which are mounted on the stud 491, the spring clip 503 holding the sleeve assembly on the stud. The diameter of the film sprockets 500 is such that when they move one-tenth of a revolution, the film is advanced a distance of one frame or for twenty index point positions of a machine cycle (Fig. 4). It will be recalled that there are ten teeth on the clutch ratchet 493 and hence a movement of one tooth of the ratchet causes the film to be advanced one frame length or for a whole machine cycle of twenty index points.

The film 521 is held on a supply reel 504 which is loosely mounted on stud 505 fastened to the plate 476. From the supply reel, the film is fed under the guide roller 506 over the sprockets 500, and under the guide roller 507. After leaving guide roller 507, the film is formed into a loop before it is fed down through the film gate comprising the two plates 508 and 509. Upon leaving the film gate, which is described in detail subsequently, the film is carried under the sprockets 510 and over a guide roller 511. A loop is now formed in the film before it is fed under guide roller 512 around sprockets 513 and over guide roller 514 to the take-up roll 515 mounted on shaft 516. This shaft 516 and roll 515 are constantly urged in a counterclockwise direction by a coil spring belt 517 stretched between pulley 518 and a pulley 519 mounted on shaft 516. Pulley 518 is fastened to a shaft 520, carrying gear 485 and journaled in plate 476.

Two additional clutch mechanisms similar to the one described above are employed for controlling rotation of sprockets 510 and 513, respectively. These three clutches operate in unison and three are utilized instead of one in order to reduce the shock on any one clutch and reduce starting retardation to thus gain greater operating speed. The uppermost clutch controls sprockets 500 which pull the film off from the supply reel 504. The center clutch controls the sprockets 510 which advance the film down through the film gate and the lowermost clutch controls the sprockets 513 which feed the film to the take-up spool 515.

Since a film is employed as the record medium, the differentially disposed spots thereon which represent amounts are analyzed or sensed by photoelectric cells. Light from a light source is conveyed to the upper and lower sensing stations and upon the traverse of the film past these stations, the light intensity is modified by the indicia spots. Such light intensity modifications affect the photoelectric cells of which there are two groups, one group being located at the upper sensing station and the second group at the lower sensing station. It will be understood that there are as many photocells in each of the two groups as there are columns to be analyzed. An elongated tubular light source 522 is held in socket 523 fastened to plate 476. At the left of the light source is a block of molded material 524 which is provided with two rod-shaped projections 525 and 526 which serve to space the main portion of the block 524 away from plate 476. Screws 527 passing through the plate 476 and into the ends of the projections 525 and 526 serve to hold the block in position. A plate 568 is fastened to the left end of block 524 and has formed therein a suitable channel in which the film 521 slides. Two pieces of quartz 528 and 529 are molded into the block 524 and conduct light from the source 522 to the upper and lower film sensing stations designated as 530 and 531, respectively. The function of each piece of quartz is to conduct and form a line of light across the film at each sensing station. A U-shaped member 598 fastened to the right end of block 524 serves as a reflector and lamp guard for the light source.

Another block of molded material 532, located at the left of the sensing stations, is supported by the plate 476 in a manner similar to the support of block 524. A plurality of quartz rods 533, one for each column, conduct light which passes through unmarked portions of the film at the upper sensing station to the photoelectric cells 534. Similarly arranged quartz rods 535 conduct light, which passes through the film at the lower sensing station, to the photoelectric cells 536. With this arrangement and with regard to a particular sensing station, all columns of the film are commonly supplied from the light source and thereafter the light conducting rods individual to each column transmit any light, which passes through the film in a given column, to the photoelectric cell.

Plate 509 has a rectangular opening in it, to enable it to fit around the right-hand portion of block 532. Brackets 537, one attached adjacent each edge of the plate 509, support pivot pins 538 to which are pivoted levers 539, one on each side of block 532. These levers are fastened to the shaft 540 which is journaled in block 532 and one of the levers 539 has an extension 541 which serves as a handle and to which is attached a spring 542, which acts through the elements described to urge the plate 509 against the film to hold it in the channel formed in plate 508.

CIRCUITS AND OPERATION

Plus and minus lines 1 and 2 (Figs. 5a and 5b) are supplied with direct current by a suitable source. Several oscillators are used to generate pulses at desired times of the cycles (see Fig. 4). These oscillators are of the relaxation type including a condenser charged and discharged periodically as long as power remains on the circuit lines. The condenser is charged through an impedance and discharged by closing a short circuiting device. The charging is progressive with respect to time and potential but the discharge by short circuiting is substantially instantaneous, producing a sharp pulse. Such an oscillator generates a saw-toothed wave. There are four oscillators directly needed in connection with the present invention. These are the D, 11, 12, and 9 oscillators shown in Figs. 5a and 5b, producing pulses at the D, 11, 12, and 9 times of the cycles (Fig. 4). Since the oscillators, though varyingly phased, are of the same structure, only one of them, the 12 oscillator (Fig. 5a) will be described in essential detail.

The 12 oscillator comprises a condenser 22b, a pentode 23b serving as the impedance through which the condenser is charged, and a gas tube 26b functioning as the short circuiting device. Condenser 22b is connected between line 1 and point 6b, which is on a connection between the cathode of the gas tube and the anode of the pentode. The gas tube is connected by a resistance 27b to line 1. The cathode of the pentode is connected by adjustable resistances 24b and 25b to line 2. With the described arrangement, the condenser is in parallel with gas tube 26b and its resistor 27b and is in series with the pentode 23b.

The control grid of the pentode is directly connected to line 2. Hence, the control grid bias is determined by the setting of the pentode's self-biasing resistors 24b and 25b. The screen potential of the pentode is determined by point 33b of a voltage divider across lines 1 and 2 and consisting of resistors 34b and 35b. The control grid of the gas tube is connected by resistors 31b and 32b to this point 33b which thus determines normal grid potential of the gas tube, as well as screen voltage of the pentode. The anode-to-cathode potential of the gas tube is determined by the condenser potential. Synchronizing pulses are supplied to the grid of the gas tube by a synchronizing means which it is unnecessary to show here but which is a synchronizing oscillator as shown in my said copending application. The synchronizing pulse is fed through condenser 302b and resistances 303b, 304b, and 31b to the grid of the gas tube. At such time as the condenser is applying sufficient potential to the anode of the gas tube, it will fire as a result of the increment of voltage added by the synchronizing pulse to the normal voltage of the grid of the gas tube. Oscillator 12 is so adjusted that the gas tube will be fired upon receiving a synchronizing pulse at each 12 time of the cycles.

The other oscillators are of the same construction as the 12 oscillator. Similar parts bear a common number but different suffix letters to distinguish them as parts of the different oscillators. The 9, 11, and D oscillators are adjusted for fly back operation in response to synchronizing pulses received at the 9, 11, and D times, respectively (Fig. 4).

A condenser 95b (Fig. 5a) is connected to the lower terminus of the resistor 27b of oscillator 12. When the gas tube 26b ignites, condenser 95b discharge therethrough, producing a sharp negative pulse on resistor 102. This negative pulse is applied via a line 261 (Figs. 5a and 5b) to the grid of a triode 63a (Fig. 5b), increasing its impedance. Consequently, the voltage difference across resistor 262 decreases and point 263 rises in voltage, charging up condenser 264. This charging action produces a positive voltage pulse on resistor 211. This positive pulse has the same steep characteristic and timing as the pulse which appears across resistor 27b when gas tube 26b fires. The purpose served by the pulse across resistor 211 will be made clear later.

Similarly, the lower terminus of resistor 27j of oscillator D (Fig. 5a) is connected by a wire 395a (Figs. 5a and 5b) to a condenser 395 (Fig. 5b). When gas tube 26j fires, condenser 395 discharges and produces a negative pulse on a resistor 396 tapped by a wire 396a leading to the grid of a tube 63x (Fig. 5b). The tube impedance rises, and the point 65x increases in voltage, charging up condenser 66x which produces a positive pulse on resistor 67x. This pulse appearing at D is used for a purpose made clear later.

In a similar manner, a condenser 152 (Fig. 5b) connected by wire 152a to resistor 27d of the 11 oscillator (Fig. 5a) discharges when gas tube 26d ignites and produces a negative pulse across a resistor 153 (Fig. 5b). This resistor is tapped by a connection to the grid of a tube 154b, and as impedance of the tube increases, the potential at point 156 rises, charging the condenser 157. As a result, a positive pulse appears at the 11 time on the resistor 220, and the purpose of this pulse will be explained later.

The 9 oscillator (Fig. 5b) operates similarly to discharge a condenser 230 which is connected by wires 230a and 230b (also see Fig. 5a) and via a switch 11 to a resistor 231. Resistor 231 is tapped by a wire 231a (Figs. 5a and 5b) leading to the grid of a triode 232b (Fig. 5b). As condenser 230 discharges, the resistor 231 is negatively pulsed and increases the impedance of triode 232b. Point 233 rises in voltage and charges condenser 234, producing on resistor 235 a positive pulse at the 9 time and the purpose of which will be described later.

In the foregoing manner, positive pulses are produced on resistors 211, 235, 220 and 67x at the 12, 9, 11, and D times, respectively, of each machine cycle.

Having connected lines 1 and 2 to a power source, the switch 610 (Fig. 5b) is closed providing power supply from amplifier 611 to the driving motor 475 by means of circuits described subsequently. With motor 475 in operation, the continually operated mechanisms of the record handling and sensing device function is previously described. The operator then threads the data bearing film into operative position in the feeding and sensing unit, and preferably the leading edge of the first data bearing frame is located so that it is about to pass the upper sensing station 530 (Fig. 1). It has been previously mentioned that film feeding is manually initiated and it should be understood that thereafter it is fed automatically past the sensing stations, frame by frame, at a uniform rate until a blank frame is detected at the upper sensing station. This indicates the end of a group of data and causes suspension of further feeding operations, as will be described hereinafter in detail.

Referring to Fig. 5b, the operator actuates the start key 451 to thereby shift its contacts to a reverse position from that shown. A condenser 612, which has been charged to the potential of point 613, as determined by a voltage divider consisting of resistors 614 and 615, now discharges in the local circuit comprising condenser 612 and resistor 616. The potential along resistor 616 is positive with respect to line 2 and therefore reduces the negative grid bias of gas triode 617 sufficiently so that it is ignited. Gas triode 617 is interposed in an impedance network which has two branches; the first branch comprises resistor 618 and pentode 619 in series between lines 1 and 2, and the second comprises resistors 620 and 621 in series between lines 1 and 2. With gas triode 617 ignited, point 622 of the second impedance branch rises to a high potential and such rise is indicated at 623 in Fig. 4, line a. Point 622 is connected via line 622a, to the screen grid of pentode 624 and accordingly, with point 622 at a high potential, the screen voltage of tube 624 is raised.

As previously described, resistor 211 (Fig. 5b) has a positive pulse appearing on it at "12." This positive potential is effective, via line 211b, to raise the control grid voltage of pentode 624. In view of the raised screen voltage of tube 624, as described above, the increase of its control grid voltage at "12" causes increase of current flow therethrough. Accordingly, at "12," the potential at point 625 rises sufficiently to effect ignition of gas triode 626. Gas tube 626 is also interposed in an impedance network which has two branches: the first branch comprises resistor 627 and tube 628b in series between lines 1 and 2 and the second comprises resistors 629 and 630, also in series between lines 1 and 2.

With gas discharge tube 626 ignited, the film feed clutch magnets 496 (also see Figs. 1 and 2), series therewith, become energized, raising levers 494a and releasing lever extensions 494b from ratchets 494, whereby detent disks 495 are clutched in for rotation by driving ratchets 493. Since detent disks 495 are fastened respectively to sleeves 498, film feed sprockets 500, 510 and 513 begin to rotate at "D" of the succeeding cycle, it being recalled that the clutch driving elements 492 rotate only one-tenth of a revolution per machine cycle. The energization of clutch magnets 496 at "12" is indicated at 631 in Fig. 4, part b. Upon rotation of the film feed sprockets, the first data bearing film frame starts to pass the upper sensing station (Fig. 1) at "D."

Since the clutch magnets 496 are energized and film feeding is taking place, the gas tube 617 (Fig. 5b) may now be extinguished. This action is controlled by the impedance network in which the clutch magnets are located. Since gas tube 626 is now in a conductive state, point 609 is at high potential. The screen grid of pentode 619, being connected to point 609, is therefore at a raised potential so that any negative control grid bias reduction of 619 increases current flow therethrough. As explained before, a "9" pulse is produced on resistor 235 (Fig. 5b), and in the cycle in which film feeding starts, this pulse, via line 235b, opposes battery 608, thus reducing the negative control grid bias of tube 619. Hence, current flow through tube 619 and resistor 618 increases, causing a voltage drop across resistor 618 of sufficient magnitude to quench gas triode 617. The accompanying return of point 622 to its normal voltage is indicated at 607 in Fig. 4, line a. By the foregoing arrangement of two impedance networks, the second of which includes the film feed clutch magnets, it is seen that the first network may be called into action by the operator's depression of the start key at any time in a cycle. The first network thereupon conditions the second network to function, under control of a "12" pulse, to energize clutch magnets 496, and film feeding operations start at a definite cyclic time, namely at "D" following clutch magnet energization. With the second network functioning, it conditions the first network to be restored to idle status by a "9" pulse, in the manner explained previously.

For purposes of illustration, assume that the first frame contains the designation of amount 749. Such first frame appears in Fig. 2 on film 521, at a point removed from the upper sensing station, to indicate clearly the manner in which recorded data appears on the film, this data being generally designated by 632.

Fig. 5b shows three of the photocells 534 of the upper sensing station (Figs. 1 and 2). These cells sense the hundreds (H), tens (T), and units (U) columns of a value field of the film. As illustrated in Fig. 5b, a plug connection is made between a socket 634 and the socket 633 associated with the hundreds order photocell 534. The plug connection places this photocell and related battery in circuit with a resistance 635. With the first frame advancing past the upper sensing station, a maximum light intensity is permitted by the film to fall upon the hundreds order photocell 534 until "7." Up to this time and in fact at any time when no indicia spot is present, there is an increased current flow through cell 534 and a higher of two possible voltage drops exists across resistor 635. Point 636 of this resistor is connected via line 637 to point 638 in a voltage divider consisting of resistors 639 and 640 in series between lines 1 and 2. Point 638 is selected with respect to line 2 so that the flow produced by the battery in series with the plugged-in photocell 534 produces a potential at point 641 on resistor 635 equal to the potential of line 2. It is apparent that whenever there is a decrease in the intensity of the light falling upon the photocell 534, there is an accompanying decrease in current flow through resistor 635 and, consequently, point 641 will rise in potential with respect to line 2.

Since the hundreds order of the first record frame bears the digit 7, the aforementioned rise in potential of point 641 occurs at "7." This voltage rise reduces the negative grid bias of a gas tube 642 sufficiently to ignite it. Tube 642 is interposed in an impedance network which has two branches: the first branch comprises resistor 643 and tube 628a in series between lines 1 and 2 and the second comprises resistors 644 and 645 likewise in series between lines 1 and 2. With gas tube 642 ignited, there is a voltage drop at point 646 of the first impedance branch. The screen grid of tube 628b is connected, as shown, to point 646 and accordingly, with tube 642 fired, the screen voltage of 628b is at such lowered value that a negative grid bias reduction is ineffective to produce increased current flow therethrough. The fall in potential of point 646 is indicated at 647 in the second cycle (Fig. 4, line c).

As described before, a positive pulse appears on resistor 228 (Fig. 5b) at "11," and this pulse, via line 648a, opposes battery 648, reducing the negative grid bias of tube 628b. Since the screen voltage of this tube is now at the mentioned low value, reduction of the control grid bias of the tube at "11" does not increase current flow therethrough. Hence, point 649 does not drop in potential with respect to line 2. Accordingly, when this "11" pulse occurs, gas triode 626 is not extinguished and therefore the feed clutch magnets 496 remain energized. This can be seen by reference to point 650 in the second cycle (Fig. 4, line b) which indicates that the potential on the clutch magnets remains at energizing value. While the record has been described as bearing a 7 spot in the hundreds order, it is clear that the operations will be similar for any other of the value spots 9 to 0 and including even a spot in the special 11 position. The foregoing indicates how each film frame is analyzed to ascertain the presence or absence of significant data therein and illustrates just how the presence of data in the form of a spot on any of the 9 to 0, 11 positions in an order of a record serves to prevent the film feed clutches from being deenergized. While the marks representing an amount recorded on the film have been described as cooperating with the sensing means at the upper station to maintain film feed and means for testing the hundreds order of each frame have been specifically described, it is understood that any order of a field may be tested by any sensing means controlled by light intensity variations or that special index marks may be provided to control the film feed. The circuits above described maintain clutches 496 energized as long as record frames bearing data are presented to the upper sensing station.

As described before, a positive pulse is produced on resistor 67x (Fig. 5b) at "D." This pulse, via line 651a, opposes battery 651 reducing the negative grid bias of tube 628a, thereby increasing current flow therethrough and causing point 646 to drop further in potential, sufficiently to extinguish gas triode 642. Substantially instantaneously with removal of the "D" pulse, point 646 rises to its normal high potential, and this is indicated at 652 in Fig. 4, line c. During the cycle just described, the first film frame is completely advanced through the upper sensing station to a position where its leading edge is about to traverse the lower sensing station 531 (Fig. 23). During travel of this frame through the upper sensing station, the fact that it was not a blank record but, rather, a data bearing record was ascertained, and the feed clutches remained energized to continue film feed. The record then traverses the lower sensing station, and the designated amount 749 will be entered in an accumulator. The entering and accumulating operations are not part of the present invention and will not be described.

During the cycle in which 749 is entered into the accumulator, the second film frame, generally designated as 656 in Fig. 2, passes the upper sensing station. This frame bears codally represented amount 356. Since the hundreds order contains digit 3, the light falling on the hundreds order photocells 534 is decreased at this time, and point 641 rises in potential, again effecting ignition of gas triode 642, in the manner described previously. Consequently, when there is a control grid bias reduction of tube 628b at "11" in this cycle, its previously lowered screen voltage renders this bias reduction ineffective, so that point 649 is not reduced in potential. Accordingly, the feed clutch magnets 496 remain energized, as indicated by point 657 in the third cycle (Fig. 4, line b).

Referring now to Fig. 2, the third film frame, generally designated 669, is a blank film frame in this example and, as has been mentioned, designates a group termination. As the second film frame 656 traverses the lower sensing station in the cycle just described, the blank third film frame 669 passes the upper sensing station. Since there is no indicia spot in the hundreds order, the light sensing the record is not diminished and the related order photocell 534 does not have its energization interrupted. Consequently, point 641 remains at the potential of line 2, and gas triode 642 does not become ignited. Accordingly, point 646 does not drop in potential and at "11," when the control grid bias of tube 628b is reduced, its screen voltage is still at a high value, as indicated at 670 in Fig. 4, line c. This negative grid bias reduction is therefore effective to increase current flow through tube 628b, and point 649 drops in potential sufficiently to extinguish gas triode 626, thus interrupting current flow therethrough. Feed clutch magnets 496 are therefore deenergized, and at "D" at the termination of the cycle, the detent disks 495 (Figs. 2 and 3) are declutched and film feeding is suspended. The foregoing has described the manner in which a blank film frame, which is indicative of a group termination, is effective to automatically cause suspension of film feeding operations.

Attention is directed to the fact that whenever film feeding operations occur, a film frame completely traverses a sensing station in one cycle. Since differentially disposed spots are employed for representing the data, it follows that a given differential designation position on the film must be positioned at a sensing station at the corresponding time in an accumulator cycle. That is to say, the 9 position of a film frame must be at a sensing station at "9" in a cycle and the 8 position in a film frame must be at the sensing station at "8," etc. Accordingly, the film feeding mechanism when it is operating must be synchronized in operation with regard to the time of production of control pulses by the oscillators at different times of a cycle.

It has already been pointed out that a movement equal to one tooth movement of ratchet 493 (Figs. 2 and 3) advances the film 521 for one frame length. It is therefore apparent that the time during which the ratchet 493 is advanced one tooth must equal that of a cycle. Accordingly, the motor 475 (Fig. 1) is driven at a speed which takes into account the gearing intermediate the motor and gears of each clutch ratchet, such as 492, in order that ratchet 493 which is mounted on and driven by 492, advance one tooth each accumulator cycle. This synchronization between the film feeding mechanism and the production of control pulses in a cycle is accomplished by supplying motor 475 (Figs. 1 and 5) from a power source which is controlled from one of the oscillators.

As stated before, a pulse of positive polarity appears on resistor 67x (Fig. 5b) at "D." A branch circuit from this resistor extends via a battery 690 to the grid of a triode 691. With no potential on resistor 67x, battery 690 maintains the grid of tube 691 at cut-off. A positive pulse, however, opposes battery 690, thereby reducing the negative grid bias of tube 691, permitting current to flow therethrough momentarily. A resonant circuit, comprising inductance 692 and condenser 693, is in series with tube 691 between lines 1 and 2. When the current through 691 increases, the resonant circuit is momentarily excited and oscillations are initiated. Inductance 692 and condenser 693 are adjusted, so that the period of oscillation is equal to the frequency with which the tube 691 momentarily passes current, i. e., at "D" once each cycle. The output of this externally controlled oscillator circuit is coupled by means of a condenser 694 and resistor 695 to the amplifier 611. The output from amplifier 611 is of sinusoidal characteristic and is of sufficient power to drive motor 475, when switch 610 is closed. This arrangement provides a power supply for motor 475 having the same frequency as the cyclic production of control pulses. It will be appreciated that the frequency of the power supply for motor 475 can be any multiple of or submultiple of the basic accumulator cycle depending upon the point in the circuit from which the exciting voltage is derived, for pulsing tube 691. In this manner, the speed of the motor is maintained synchronized with the operation of the oscillator circuits and therefore the proper timed relation always prevails between sensing of designation positions of each record and the production of control pulses in a machine cycle.

While there have been shown and described and pointed out the fundamental novel features of the invention as applied to a single modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, means for feeding record material having differential designation positions any of which may be formed with a designation, a photoelectric cell past which the material is fed to be sensed while in motion for a designation in one of said positions, control means to interrupt feeding operation, and an electronic tube circuit controlled by the photoelectric cell upon sensing a designation in any said position for rendering the control means ineffective to interrupt feeding operation.

2. In a cyclically functioning machine, means to sense designations on records, means feeding the records, one each cycle, past the sensing means, a circuit controlling the feeding means, an electronic discharge tube so connected to said circuit that upon a change in electronic status of the tube the circuit is adjusted in electrical condition to interrupt operation of the feeding means, cyclic means producing a pulse each cycle tending to change the status of the tube, and means under control of the sensing means upon sensing of a designation during the cycle for preventing said change in status, whereby feeding operation continues when designations are sensed on the record and is interrupted when a designation is not sensed on a record during a cycle.

3. In combination, means to sense records for designations, mechanism to feed the records successively past the sensing means, electromagnetic clutch means rendering the feeding mechanism effective, a circuit energizing the clutch means, an electronic discharge device in shunt with said circuit, means for applying potential to said discharge device tending to increase current flow therethrough and thereby to cause deenergization of the clutch means so as to interrupt record feeding operation, and means under control of the sensing means upon sensing a designation for preventing the increase in current flow through said discharge device, whereby the clutch means remains effective.

4. In combination, means to sense records for designations, mechanism to feed the records past the sensing means, a circuit having alternative electrical conditions in one of which it enables the feeding mechanism to continue in operation and in the other of which it disables the feeding mechanism, an electronic trigger tube for selectively determining the condition of said circuit, and means under control of the sensing means for selectively controlling the trigger tube and, thereby, the condition of the circuit, to interrupt feeding operation when a designation is not sensed on a record and to continue operation as long as designations are sensed on the records.

5. In a cyclically functioning machine, means to sense records for designations, mechanism to feed records past the sensing means, one record each cycle, a control circuit for the feeding mechanism, and an electronic discharge tube including a control electrode whose potential varies under control of the sensing means according to whether a designation is or is not sensed on a record, said tube also including a second control electrode pulsed at a fixed time of each cycle to modify current flow in the tube when the potential on the first mentioned control electrode is at high value, said tube selectively controlling the circuit according to current flow in the tube so as to interrupt record feeding operation when a designation is not sensed during the cycle and to continue record feeding operation when a designation is sensed during the cycle.

6. In a cyclically operating machine, means to sense records for designations, mechanism to feed the records, one each cycle, across said sensing means, electronic discharge means, means producing a pulse at a fixed time of each cycle and applying said pulse to an input circuit of the discharge means, means under control of the sensing means for enabling said pulse to be selectively effective to change the electronic status of the discharge means depending on whether a designation has or has not been sensed on a record during the cycle, and means controlled by the discharge means in accordance with its electronic status for selectively determining continuation of feeding operation.

7. In cyclically functioning apparatus, an electronic circuit altered in electronic condition at a variable time of a cycle, a second electronic circuit with means controlled by the first circuit upon alteration in its condition for preparing the second circuit for a change in electronic status, means producing an electrical pulse at a fixed time of a cycle and impressing said pulse upon the second circuit to effect the change in status for which it has been prepared, work means thereupon brought into operation by the second circuit, means in the first circuit controlled by the second circuit upon its change in status for preparing the first circuit to be reset to its previous condition, and means producing a pulse at a fixed time of a cycle and impressing the pulse upon the first circuit to reset the first circuit, after being prepared, to the previous condition.

8. In a cyclically functioning machine, feeding means for feeding record material cyclically through the machine, a circuit conditionable to render the feeding means effective, electronic discharge means adjustable in status at any point of the cycle for thus conditioning the circuit, and means controlled by the circuit upon being so conditioned and jointly controlled by an electrical pulse at a suitable time of the cycle for restoring the discharge means to its initial status.

ARTHUR H. DICKINSON.

REFERENCES CITED

The following references are of record in the file of this patent:

UNITED STATES PATENTS

| Number | Name | Date |
| --- | --- | --- |
| 1,964,874 | Frankboner | July 3, 1934 |
| 2,069,595 | Thomas | Feb. 2, 1937 |
| 2,093,529 | Tauschek | Sept. 21, 1937 |
| 2,120,369 | Mills | June 14, 1938 |
| 2,145,574 | Rimberg | Jan. 31, 1939 |
| 2,176,828 | Walker | Oct. 17, 1939 |
| 2,254,932 | Boyce | Sept. 2, 1941 |
| 2,254,933 | Boyce | Sept. 2, 1941 |
| 2,256,458 | Morck | Sept. 16, 1941 |
| 2,370,727 | Holden | Mar. 6, 1945 |